US011888207B2

(12) United States Patent
Ji et al.

(10) Patent No.: US 11,888,207 B2
(45) Date of Patent: Jan. 30, 2024

(54) ANTENNA APPARATUS

(71) Applicant: KMW INC., Hwaseong-si (KR)

(72) Inventors: Kyo Sung Ji, Hwaseong-si (KR); Chang Woo Yoo, Hwaseong-si (KR); Bae Mook Jeong, Suwon-si (KR); Min Seon Yun, Anyang-si (KR); Jin Soo Yeo, Hwaseong-si (KR)

(73) Assignee: KMW INC., Hwaseong-si (KR)

( * ) Notice: Subject to any disclaimer, the term of this patent is extended or adjusted under 35 U.S.C. 154(b) by 74 days.

(21) Appl. No.: 17/555,454

(22) Filed: Dec. 19, 2021

(65) Prior Publication Data

US 2022/0115760 A1 Apr. 14, 2022

Related U.S. Application Data

(63) Continuation of application No. PCT/KR2020/007769, filed on Jun. 16, 2020.

(30) Foreign Application Priority Data

Jun. 28, 2019 (KR) ........................ 10-2019-0077894
Jan. 16, 2020 (KR) ........................ 10-2020-0005720

(51) Int. Cl.
*H01Q 1/02* (2006.01)
*H01Q 1/42* (2006.01)

(52) U.S. Cl.
CPC ............... *H01Q 1/02* (2013.01); *H01Q 1/422* (2013.01)

(58) Field of Classification Search
CPC ............ H01Q 1/02; H01Q 1/22; H01Q 1/005; H01Q 1/061; H01Q 1/42; H01Q 1/246; H01Q 1/422
See application file for complete search history.

(56) References Cited

U.S. PATENT DOCUMENTS

| | | | | |
|---|---|---|---|---|
| 5,898,412 | A | 4/1999 | Jones et al. | |
| 11,611,143 | B2 * | 3/2023 | Hou | H01Q 15/14 |

(Continued)

FOREIGN PATENT DOCUMENTS

| | | | |
|---|---|---|---|
| EP | 3780260 | A1 | 2/2021 |
| EP | 3972052 | A1 | 3/2022 |

(Continued)

OTHER PUBLICATIONS

International Search Report dated Sep. 24, 2020 for International Application No. PCT/KR2020/007769 and its English translation.

*Primary Examiner* — Lam T Mai
(74) *Attorney, Agent, or Firm* — Insight Law Group, PLLC; Seung Lee

(57) ABSTRACT

An antenna apparatus is disclosed, including a lower housing, a middle housing disposed on the lower housing and having one surface formed with one or more first heat dissipation fins, a first accommodation space formed by the lower housing and the middle housing, at least one first heat-generating element disposed in the first accommodation space, one or more heat dissipation supports each disposed on the middle housing and having at least one surface formed with one or more second heat dissipation fins, and an antenna module supported on the one or more heat dissipation supports.

18 Claims, 12 Drawing Sheets

(56) References Cited

U.S. PATENT DOCUMENTS

| | | | | |
|---|---|---|---|---|
| 11,649,000 | B2 * | 5/2023 | Kuramochi | B62J 9/30 180/220 |
| 11,652,300 | B2 * | 5/2023 | Li | H01Q 21/26 343/702 |
| 2004/0244397 | A1 | 12/2004 | Kim | |
| 2018/0358710 | A1 * | 12/2018 | Toyao | H01Q 15/148 |
| 2019/0267701 | A1 * | 8/2019 | Kim | H01Q 21/28 |
| 2020/0021005 | A1 * | 1/2020 | Kosaka | H01Q 1/42 |
| 2023/0021186 | A1 * | 1/2023 | Kim | H05K 7/20345 |
| 2023/0047942 | A1 * | 2/2023 | Kim | H01Q 1/02 |

FOREIGN PATENT DOCUMENTS

| | | | |
|---|---|---|---|
| KR | 10-2006-0035209 | A | 4/2006 |
| KR | 10-2010-0109761 | A | 10/2010 |
| KR | 10-2018-0055770 | A | 5/2018 |
| KR | 10-2018-0118549 | A | 10/2018 |
| KR | 10-2019-0060180 | A | 6/2019 |

* cited by examiner

ANTENNA APPARATUS

CROSS-REFERENCE TO RELATED APPLICATIONS

This application is a continuation application of International Application No. PCT/KR2020/007769, filed Jun. 16, 2020, which claims priority to and benefit under 35 U.S.C. § 119(a) of Korean Patent Application Nos. 10-2019-0077894, filed on Jun. 28, 2019 and 10-2020-0005720, filed on Jan. 16, 2020, the entire contents of which are incorporated herein by reference.

TECHNICAL FIELD

The present disclosure in some embodiments relates to an antenna apparatus.

BACKGROUND

The statements in this section merely provide background information related to the present disclosure and do not necessarily constitute prior art.

Wireless communication technology, for example, multiple-input multiple-output (MIMO) technology utilizes multiple antennas to dramatically increase data transmission capacity. With such an antenna system, the more the channel capacity, the more data transmission and reception are achieved.

An accordingly increased number of both transmit and receive antennas leads to increased channel capacity for transmitting more data. For example, 10 fold more antennas can secure a channel capacity of about 10 times more for the same frequency band used as compared to employing a single antenna system.

In MIMO technology, as the number of antennas increases, so do the numbers of transmitters and filters. Meanwhile, high power is required to extend the coverage of the MIMO antenna, which causes power consumption and heat generation as negative factors in reducing weight and spacing.

In particular, where limited space is available for installing a MIMO antenna with a stacked structure of radio frequency (RF) devices and digital devices implemented in modules, there is a need for a more compact and miniaturized antenna architecture to maximize installation ease and space utilization. Additionally, the antenna compactification and miniaturization require an effective heat dissipation structure for dissipating heat generated from the antenna components.

DISCLOSURE

Technical Problem

Accordingly, the present disclosure seeks to provide a MIMO antenna apparatus having excellent heat dissipation characteristics.

The problems to be solved by the present disclosure are not limited to the issues mentioned above, and other unmentioned problems will be clearly understood by those skilled in the art from the following description.

SUMMARY

At least one aspect of the present disclosure provides an antenna apparatus including a lower housing, a middle housing, a first accommodation space, at least one first heat-generating element, one or more heat dissipation supports, and an antenna module. The middle housing is disposed on the lower housing and has one surface formed with one or more first heat dissipation fins. The first accommodation space is formed by the lower housing and the middle housing. The least one first heat-generating element is disposed in the first accommodation space. The one or more heat dissipation supports are each disposed on the middle housing and have at least one surface formed with one or more second heat dissipation fins. The antenna module is supported on one or more heat dissipation supports.

DETAILED DESCRIPTION

Figure 1:
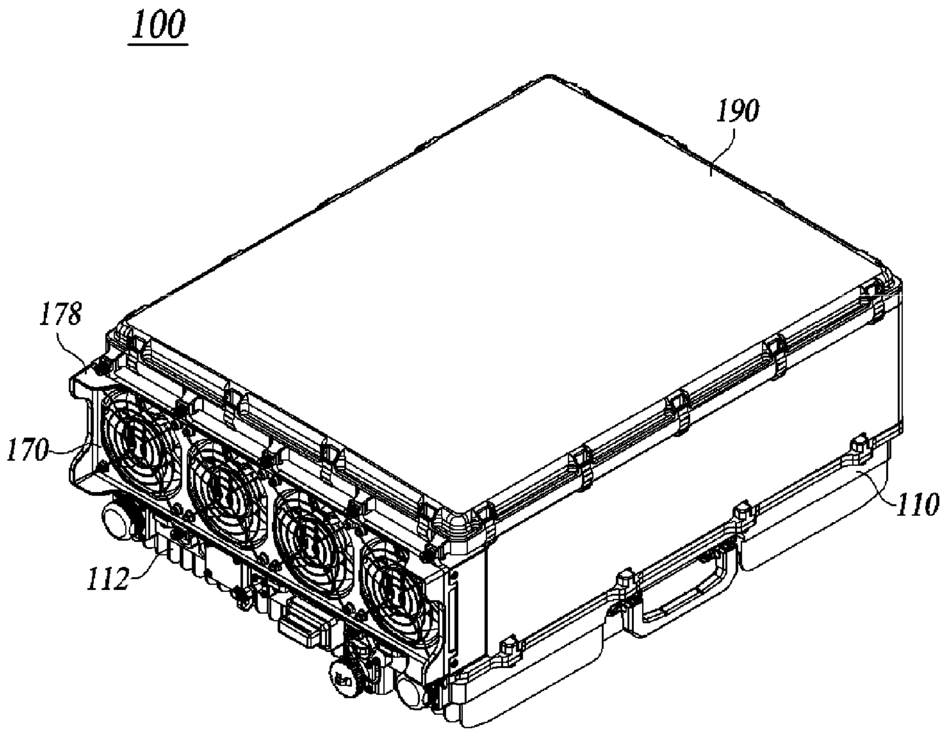
FIG. 1 is a front perspective view of an antenna apparatus according to at least one embodiment of the present disclosure.

Hereinafter, some embodiments of the present disclosure will be described in detail with reference to the accompanying drawings. In the following description, like reference numerals preferably designate like elements, although the elements are shown in different drawings. Further, in the following description of some embodiments, a detailed description of related known components and functions when considered to obscure the subject of the present disclosure will be omitted for the purpose of clarity and for brevity.

Additionally, alphanumeric code such as first, second, i), ii), (a), (b), etc., in numbering components are used solely for the purpose of differentiating one component from the other but not to imply or suggest the substances, the order or sequence of the components. Throughout this specification, when a part "includes" or "comprises" a component, the part is meant to further include other components, not excluding thereof unless there is a particular description contrary thereto.

To avoid confusion in understanding the present disclosure, 'upper' or 'upward' refers to the direction in which a radome 190 (see FIG. 1) is provided. Additionally, 'lower' or 'downward' refers to a direction in which a lower housing 110 (FIG. 1) is provided. Additionally, 'sideward' refers to a direction between upward and downward. Further, 'on' shall include all of those positioned above the reference plane in contact with the reference plane and those that are not in contact and are positioned relatively upward.

In the present disclosure, the 'first direction' means a direction from a lower position upward. The 'second direction' refers to a direction different from the first direction, preferably a direction perpendicular to the first direction. Additionally, the 'third direction' refers to a direction different from the first direction and the second direction, preferably a direction perpendicular to both the first direction and the second direction. The present disclosure, although not limited thereto, assumes that the second direction is the width direction of a middle housing 140 and the third direction is the longitudinal direction of the middle housing 140. As described above, the terminology related to the direction is only for the convenience of explanation and to prevent confusion of understanding, which should not limit the scope of the present disclosure.

Additionally, since the circuits shown in the drawings of the present disclosure are not equivalent to the essential content of the present disclosure and is only abstractly expressed for understanding, the scope of the present disclosure should not be limited thereby.

Figure 2:
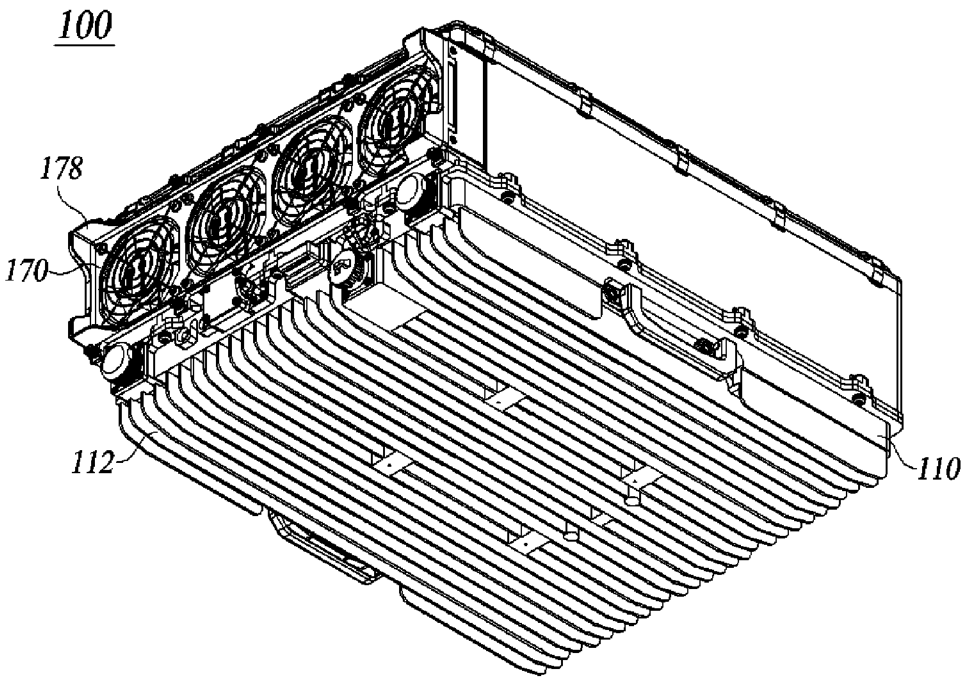
FIG. 2 is a bottom perspective view of the antenna apparatus according to at least one embodiment of the present disclosure.
Figure 3:
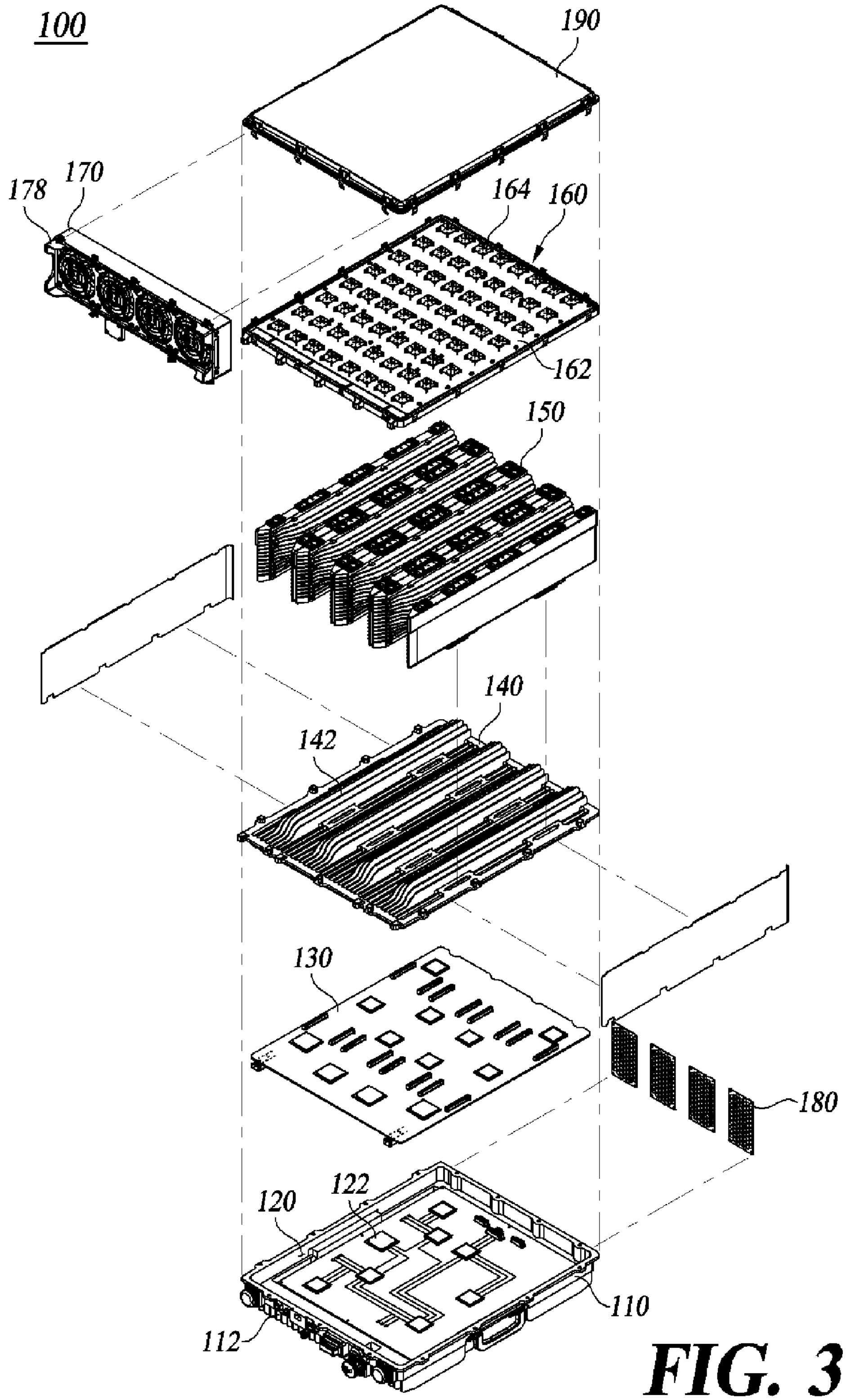
FIG. 3 is an exploded perspective view of the antenna apparatus according to at least one embodiment of the present disclosure.

FIG. 1 is a front perspective view of an antenna apparatus according to at least one embodiment of the present disclosure. FIG. 2 is a bottom perspective view of the antenna apparatus according to at least one embodiment. FIG. 3 is an exploded perspective view of the antenna apparatus according to at least one embodiment.

As shown in FIGS. 1 to 3, the antenna apparatus 100 includes all or some of a lower housing 110, a middle housing 140, a lower housing 110, a first accommodation space 120 formed by the lower housing 110 and the middle housing 140, one or more first heat-generating elements 122, heat dissipation supports 150, and an antenna module 160.

The lower housing 110 is located at the lowermost side of the antenna apparatus 100. As shown in FIG. 2, the lower housing 110 may include a heat dissipation bottom 112.

The heat dissipation bottom 112 may be in the form of a heat sink with one or more heat dissipation fins arranged to be spaced apart and extending outwardly of the antenna apparatus 100 from one surface of the lower housing 110. However, the heat dissipation bottom 112 may have an appropriate shape, such as a curved shape in a meandering pattern, if necessary.

The heat dissipation bottom 112 may be integrally extruded together with the lower housing 110 in manufacture. However, in some embodiments of the present disclosure, the heat dissipation bottom 112 is separately manufactured and detachably attached to the lower housing 110.

The middle housing 140 may be disposed on the lower housing 110 and may have at least a portion that is in contact with the lower housing 110 to form the first accommodation space 120. At this time, the middle housing 140 and the lower housing 110 may be joined by press-fitting.

The middle housing 140 has one surface that includes one or more first heat dissipation fins 142 protruding in the second direction. The specific structure and benefit of the first heat dissipation fin 142 will be detailed when discussing FIGS. 4 to 6.

The first accommodation space 120 is a space formed by the coupling between the lower housing 110 and the middle housing 140. The first heat-generating elements 122 and a digital board 130 may be disposed in the first accommodation space 120.

The first heat-generating elements 122 may include a substrate and a power supply unit (PSU) mounted on the substrate. In this case, the substrate may be implemented as a printed circuit board (PCB). The PSU is configured to provide operating power to electrical components including a plurality of communication components. The PSU may be provided with docking protrusions (not shown) so that they can be docked through docking holes (not shown) formed on the inner surface of the lower housing 110, to which the present disclosure is not limited. Meanwhile, heat generated during the operation of the PSU may be transferred to one or more of the lower housing 110 and the middle housing 140 through the docking protrusions and the docking holes. The transfer of heat generated from the PSU to the lower housing 110 causes heat radiation to the outside through the heat dissipation bottom 112, allowing the first accommodation space 120 to be properly cooled.

When transferred to the middle housing 140, the heat generated from the PSU is radiated through the first heat dissipation fins 142, allowing the first accommodation space 120 to be properly cooled.

The digital board 130 has a digital processing circuit formed thereon. Specifically, the digital board 130 converts digital signals received from a base station into analog radio frequency (RF) signals, converts and transmits the analog RF signals received from the antenna module 160 into digital signals to the base station.

One or more heat dissipation supports 150 are disposed on the middle housing 140. The heat dissipation supports 150 each have one end supported by one surface of the middle housing 140 and the other end electrically connected at least in part to the antenna module 160.

One or more heat dissipation supports 150 protrude along the first direction and extend along the third direction. Meanwhile, with multiple heat dissipation supports 150, at least some of them may be disposed to be spaced apart from each other in the second direction. Additionally, with multiple heat dissipation supports 150 provided, at least some of them may be arranged to be in contact with each other between single surfaces. This allows space-efficient integration of the heat dissipation supports 150.

The heat dissipation supports 150 are preferably arranged side by side with each other. This can form a space between the adjacent heat dissipation supports 150, and air may flow therethrough. Accordingly, heat generated by the electrical components may be radiated to the outside of the antenna apparatus 100 through airflow paths through the space.

However, the heat dissipation supports 150 according to the present disclosure are not necessarily limited to this example, and the plurality of heat dissipation supports 150 may be alternately arranged in a V-shape between adjacent heat dissipation supports 150.

The cross-section of the heat dissipation support 150 may be a rectangle, but it is not a requirement, and the heat dissipation support 150 may have at least one end reduced in height to take a trapezoidal shape.

The heat dissipation support 150 may include one or more second heat dissipation fins 154 that each protrude from at least one side surface in the second direction and protrude in a row along the first direction. The specific configuration and benefit of the second heat dissipation fins 154 will be detailed when discussing FIGS. 4 to 6.

The antenna module 160 includes communication components mounted on the antenna substrate 162, for example, antenna elements 164. The antenna substrate 162 may be implemented as a printed circuit board (PCB). On the rear surface of the antenna substrate, cavity filters (not shown) may be disposed as many as the number of antenna elements 164, and related substrates (not shown) may be sequentially stacked thereon.

A blower fan module 170 may be provided on at least one side of the antenna apparatus 100. The blower fan module 170 is configured to cool the antenna apparatus 100 by supplying cold air to the inside thereof. To this end, the blower fan module 170 is disposed adjacent to single ends of the heat dissipation supports 150 extending in the third direction.

In at least one embodiment of the present disclosure, the blower fan module 170 is shown to be disposed on only one side of the antenna apparatus 100. However, the present disclosure envisions alternatives, including another blower fan module 170 to be disposed on the other side of the antenna apparatus 100. In other words, multiples of the blower fan module 170 may be disposed adjacent to one end and the other end of the heat dissipation support 150 extending in the third direction, respectively.

On the other hand, the specific configuration of the blower fan module 170 will be described when discussing FIG. 8.

The antenna apparatus 100 may further include mesh members 180. The mesh members 180 are disposed on the other side of the antenna apparatus 100 to be adjacent to the other end of the heat dissipation support 150 extending in the third direction. Cool air may be sucked in or discharged through the mesh members 180. This allows the heated air inside the antenna apparatus 100 to be discharged to the outside to properly cool the antenna apparatus 100.

The mesh member 180 includes one or more perforations which may be in the form of a regular hexagon. Such perforated mesh members can provide structural stability of the antenna apparatus 100 and cost reduction of materials. However, the present disclosure includes other embodiments for providing one or more perforations with various shapes and sizes.

The antenna apparatus 100 may further include a radome 190. The radome 190 is disposed on the antenna module 160 and is configured to cover at least a portion of the antenna module 160. The radome 190 serves to protect the antenna module 160 from external wind pressure.

Figure 4:
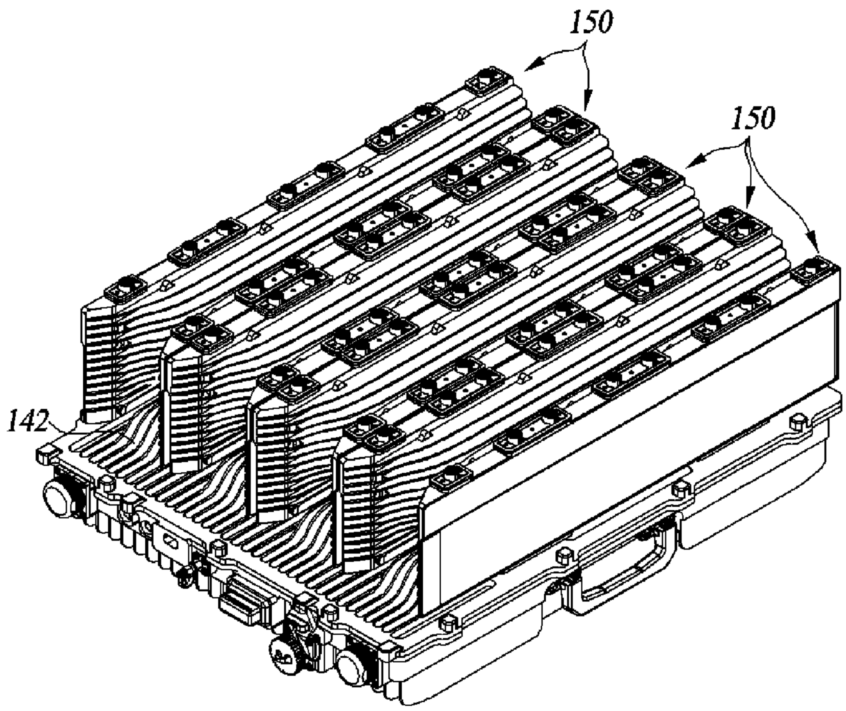
FIG. 4 is a perspective view showing heat dissipation supports coupled to a middle housing according to at least one embodiment.
Figure 5:
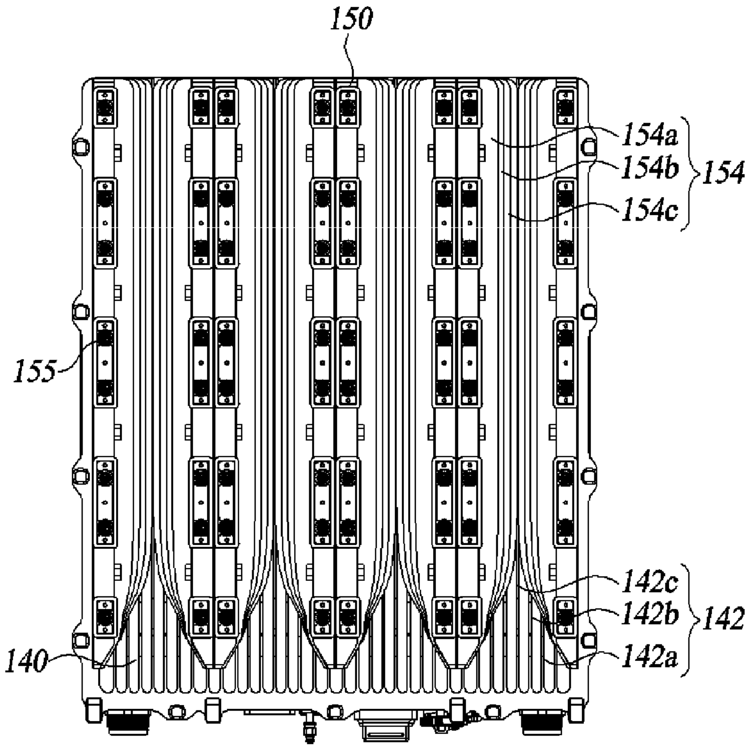
FIG. 5 is a plan view showing the heat dissipation supports coupled to the middle housing according to at least one embodiment.
Figure 6:
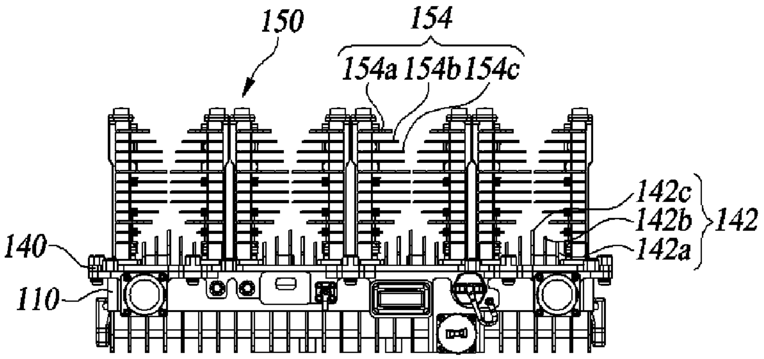
FIG. 6 is a front view showing the heat dissipation supports coupled to the middle housing according to at least one embodiment.

FIG. 4 is a perspective view showing the heat dissipation supports coupled to the middle housing according to at least one embodiment. FIG. 5 is a plan view illustrating the heat dissipation supports coupled to the middle housing according to at least one embodiment. FIG. 6 is a front view illustrating the heat dissipation support coupled to the middle housing according to at least one embodiment.

By referring to FIGS. 4 to 6, the first heat dissipation fin 142 and the heat dissipation support 150 according to at least one embodiment will be described as to their features.

The first heat dissipation fins 142 may be disposed to be spaced apart from each other in the second direction between each two adjacent heat dissipation supports 150. The first heat dissipation fins 142 extend in a direction parallel to the airflow paths formed by the plurality of heat dissipation supports 150. Therefore, when cold air is supplied through the airflow paths, no resistance occurs in the direction opposite to the flow direction of the cold air. This allows an efficient dissipation of heat.

The first heat dissipation fins 142 may include two or more heat dissipation fins 142*a* having a first height. Additionally, the first heat dissipation fins 142 may include two or more heat dissipation fins 142*b* having a second height greater than the first height between the two or more heat dissipation fins 142*a*. Further, the first heat dissipation fins 142 may include one or more heat dissipation fins 142*c* having a third height greater than the second height between the two or more heat dissipation fins 142*b*. However, the first heat dissipation fin 142 according to at least one embodiment of the present disclosure is not necessarily limited to this example, and may further include a heat dissipation fin having a fourth height greater than the third height. In this case, the first to fourth heights mean the heights of the first heat dissipation fins 142 at their points most spaced apart from the one surface of the middle housing 140.

As shown in FIG. 6, the plurality of first heat dissipation fins 142 formed between each two adjacent heat dissipation supports 150 may be configured to have the most protrusive center.

On the other hand, the heat dissipation fins having the greatest height directly overlie the electrical components that are arranged along the length of the same highest heat dissipation fins in the first accommodation space 120. Accordingly, heat dissipation is best achieved at portions closest to the heat-generating components, thereby maximizing heat dissipation efficiency.

Meanwhile, FIGS. 4 to 6 illustrate that the multiple heat dissipation supports 150 are parallel to each other and the first heat dissipation fins 142 extend in parallel to the multiple heat dissipation supports 150, but the present disclosure is not so limited. For example, even with multiple adjacent heat dissipation supports spaced apart in a V shape, the first heat dissipation fins 142 may extend along the length of the airflow paths.

The heat dissipation support 150 includes one or more second heat dissipation fins 154 protruding in the second direction from at least one side surface of the heat dissipation support 150. The second heat dissipation fins 154 extend along the third direction.

The second heat dissipation fins 154 may include a plurality of second heat dissipation fins 154*a*, 154*b*, and 154*c* arrayed in parallel in the first direction.

The second heat dissipation fins 154 may include two or more heat dissipation fins 154*a* having a first width. Additionally, the second heat dissipation fins 154 may include two or more heat dissipation fins 154*b* having a second width greater than the first width between the two or more heat dissipation fins 154*a*. Further, the second heat dissipation fins 154 may include one or more heat dissipation fins 154*c* having a third width greater than the second width between the two or more heat dissipation fins 154*b*. However, the second heat dissipation fin 154 according to at least one embodiment is not necessarily limited to this example, and may further include a heat dissipation fin having a fourth width greater than the third width. In this case, the first to fourth widths are equivalent to the widths of the second heat dissipation fins 154 at their points farthest from one surface of the heat dissipation support 150.

As shown in FIG. 5, the second heat dissipation fins 154 may be configured to have a reduced width at one end of the heat dissipation support 150.

As shown in FIG. 6, the plurality of second heat dissipation fins 154 may be configured to have the most protrusive center.

The heat dissipation support 150 has a second accommodation space 151 therein. Electrical components may be disposed in the second accommodation space 151. Accordingly, the antenna apparatus 100 can efficiently hold an integration of electrical components internally, and at the same time efficiently dissipate heat. Hereinafter, the internal structure of the heat dissipation support 150 in FIG. 7 will be described.

Figure 7:
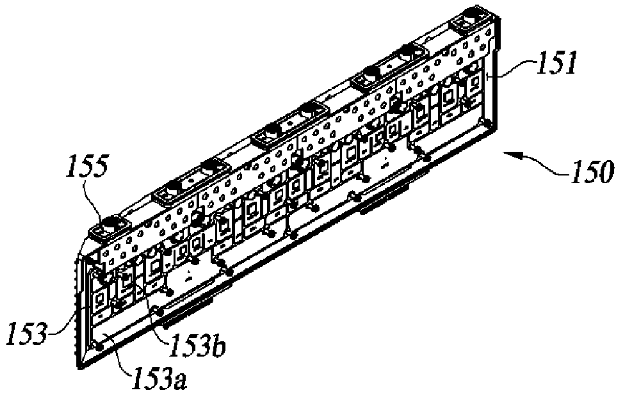
FIG. 7 is a front perspective view showing the inside of a heat dissipation support according to at least one embodiment.

FIG. 7 is a front perspective view showing the inside of the heat dissipation support according to at least one embodiment.

As shown in FIG. 7, the heat dissipation support 150 includes the second accommodation space 151, one or more second heat-generating elements 153, the second heat dissipation fins 154, and RF signal connection units 155.

The second accommodation space 151 is a space formed inside the heat dissipation support 150. The second heat-generating elements 153 may be disposed in the second accommodation space 151.

The second heat-generating elements 153 may be, for example, an FPGA module. The FPGA module may include an FPGA substrate 153*a* disposed in the second accommodation space 151 and a plurality of FPGAs 153*b* installed on the FPGA substrate 153*a*.

The FPGA 153*b* is a kind of electrical component and corresponds to an electrical device that requires heat dissipation. In the antenna apparatus 100 according to at least one embodiment, as shown in FIGS. 4 to 6, heat generated from the FPGA module may be radiated through the second heat dissipation fins 154.

The one or more RF signal connection units 155 are disposed on at least one surface of the heat dissipation support 150 and can transmit electrical signals generated from electrical components disposed in the second accommodation space 151 to the antenna module 160. This allows the heat dissipation support 150 to electrically connect the electrical components disposed in the first accommodation space 120 to the antenna module 160. To this end, at least a portion of the RF signal connection unit 155 may be formed of metal.

In the second accommodation space 151, not only the FPGA 153*b*, but also a multi-band filter (MBF) may be further disposed.

Additionally, a power amplifier may be disposed in the second accommodation space 151.

Figure 8:
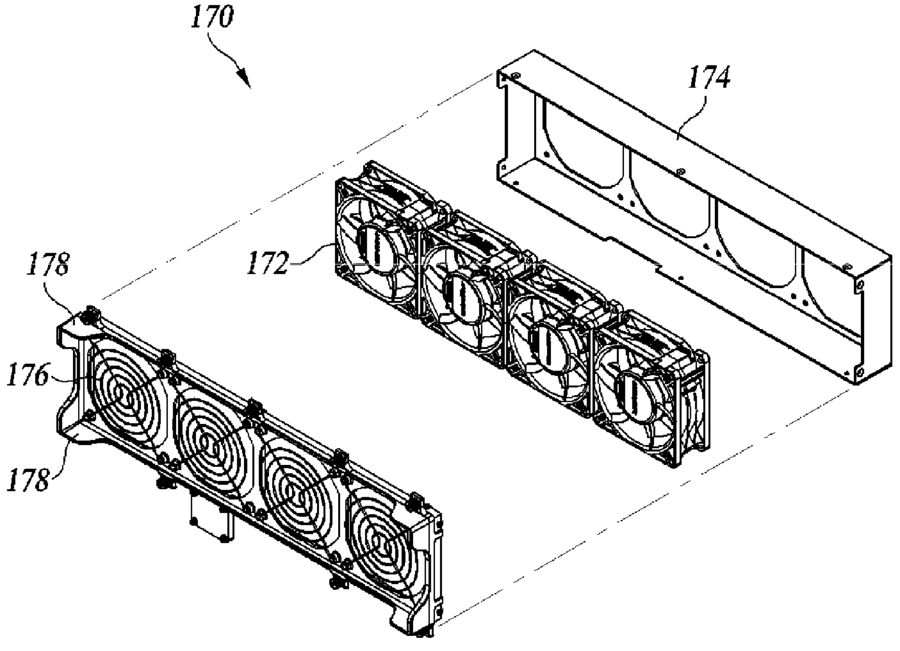
FIG. 8 is an exploded perspective view of a blower fan module according to at least one embodiment of the present disclosure.

FIG. 8 is an exploded perspective view of a blower fan module according to at least one embodiment of the present disclosure.

As shown in FIG. 8, the blower fan module 170 may be disposed at one end in which an airflow path is formed.

The blower fan module 170 may include one or more blade sets 172, a blowing fan housing 174, a blowing fan cover 176, and protection protrusions 178.

The one or more blade sets 172 when rotated in a predetermined direction supply cold air into the antenna apparatus 100.

The blower fan housing 174 is configured to surround at least a portion of one or more blade sets 172. The blower fan housing 174 may be formed along the length of at least one surface of the antenna apparatus 100.

The blowing fan cover 176 is coupled to the blowing fan housing 174, and is configured to accommodate one or more blade sets 172 in cooperation with the blowing fan housing 174.

The protective protrusions 178 protrude toward the outside of the antenna apparatus 100 from at least some portion of the blower fan cover 176. The protective protrusions 178 most protrude from one surface on which the blower fan module 170 is disposed. This can prevent a port disposed on one surface of the antenna apparatus 100 from being damaged from external impact. For example, when the antenna apparatus 100 is overturned due to drafts or the like, the protective protrusions can prevent the port from colliding with the ground.

Figure 9:
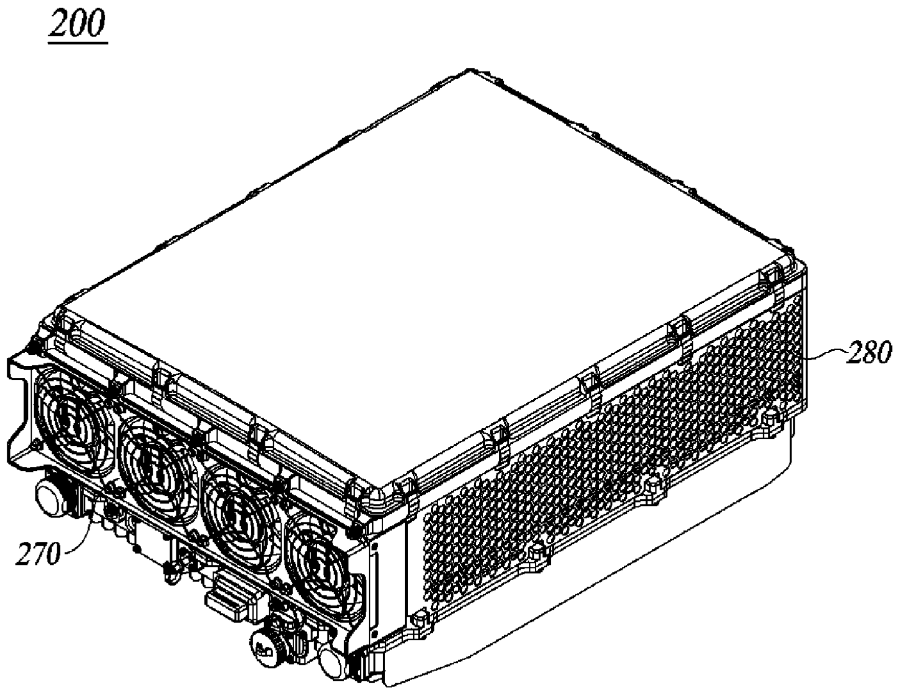
FIG. 9 is a front perspective view of an antenna apparatus according to another embodiment of the present disclosure.
Figure 10:
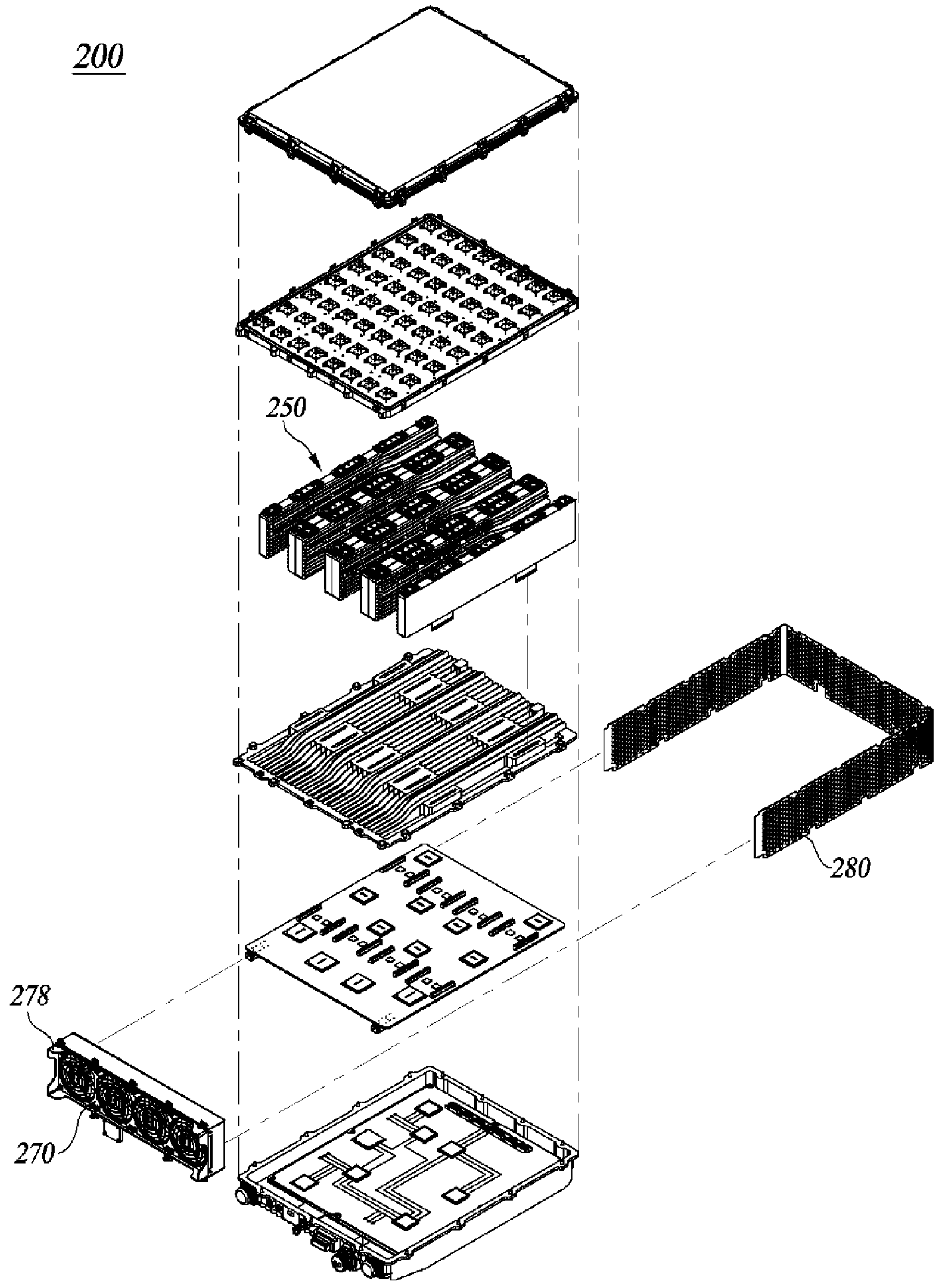
FIG. 10 is an exploded perspective view of the antenna apparatus according to another embodiment.

FIG. 9 is a front perspective view of an antenna apparatus according to another embodiment of the present disclosure. FIG. 10 is an exploded perspective view of the antenna apparatus according to another embodiment.

As shown in FIGS. 9 and 10, the antenna apparatus 200 according to another embodiment of the present disclosure further includes a mesh member 280 that covers multiple sides of the antenna apparatus. Although FIGS. 9 and 10 illustrate the mesh member 280 as being disposed on three sides except for the blower fan module 270, it is not necessarily limited to the illustrated arrangement, and it suffices to be placed at two or more sides except for the blower fan module 270.

By placing the mesh member 280 on the other sides in addition to one side of the antenna apparatus 200, a larger volume of cool air may be supplied. Accordingly, the mesh member covering more of the antenna apparatus can save a placement of another blower fan module 270 by radiating heat from the inside of the antenna apparatus 200 more efficiently.

Figure 11:
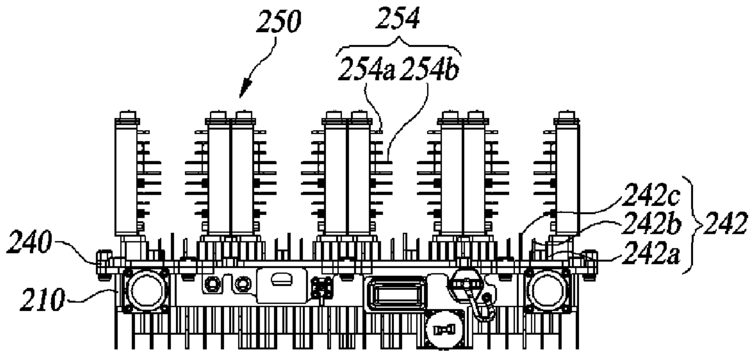
FIG. 11 is a front view showing heat dissipation supports coupled to a middle housing according to another embodiment of the present disclosure.
Figure 12:
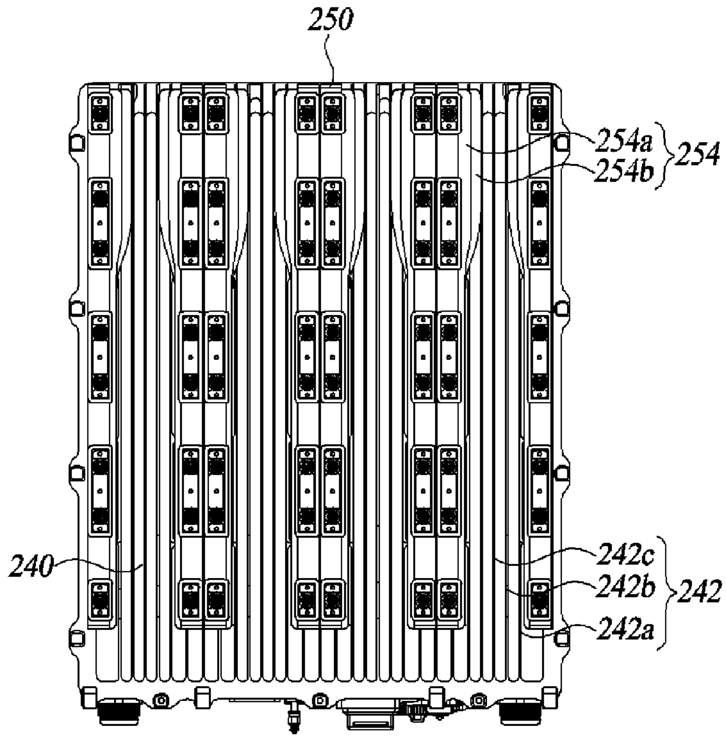
FIG. 12 is a plan view showing the heat dissipation supports coupled to the middle housing according to another embodiment.

FIG. 11 is a front view showing heat dissipation supports coupled to a middle housing according to another embodiment of the present disclosure. FIG. 12 is a plan view showing the heat dissipation support coupled to the middle housing according to another embodiment.

As shown in FIGS. 11 and 12, the antenna apparatus 200 according to another embodiment has second heat dissipation fins 254 that protrude relatively less. The protruding lengths of the second heat dissipation fins 254 may be appropriately selected according to the type and arrangement of the substrate arranged in heat dissipation supports 250 and the electronic components mounted on the substrate.

Additionally, the second heat dissipation fins 254 may include a plurality of second heat dissipation fins 254*a* and 254*b* arrayed in parallel in the first direction.

The second heat dissipation fins 254 may include two or more heat dissipation fins 254*a* having a first width. Additionally, the second heat dissipation fins 254 may include two or more heat dissipation fins 254*b* having a second width greater than the first width between the two or more heat dissipation fins 254*a*. Further, the second heat dissipation fins 254 may further include one or more heat dissipation fins (not shown) having a third width greater than the second width between the two or more heat dissipation fins 254*b*. In this case, the first to third widths refer to the widths of the heat dissipation fins 254 at their points farthest from one surface of each heat dissipation support 250.

As shown in FIG. 11, the heat dissipation fins 254 according to another embodiment of the present disclosure also have their longest width that is shortened relative to other embodiments. In other words, the second heat dissipation fins 254 may be configured to have a reduced width at a point relatively spaced apart from one end of the heat dissipation support 250.

Figure 13:
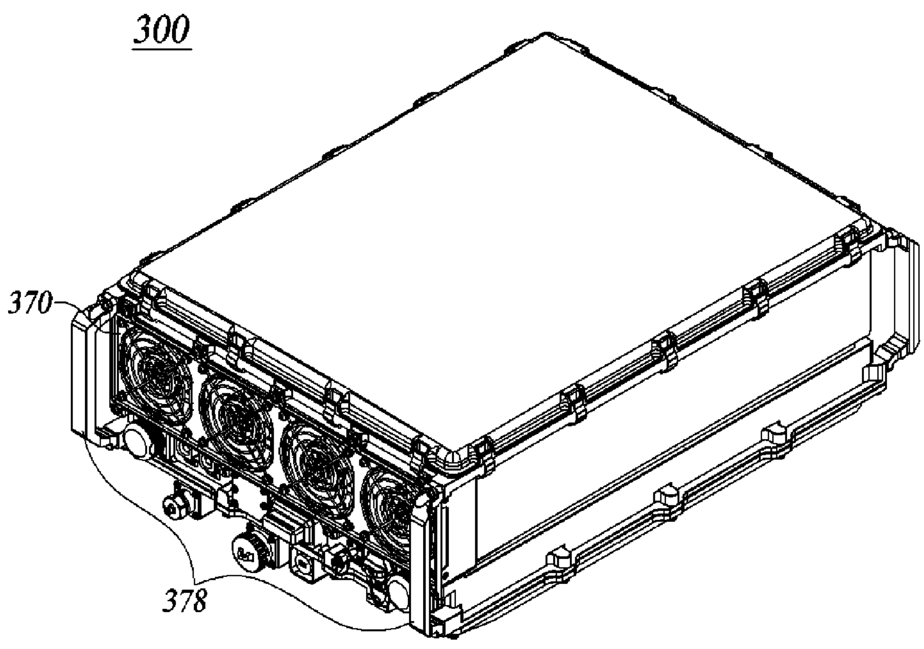
FIG. 13 is a front perspective view of an antenna apparatus according to yet another embodiment of the present disclosure.
Figure 14:
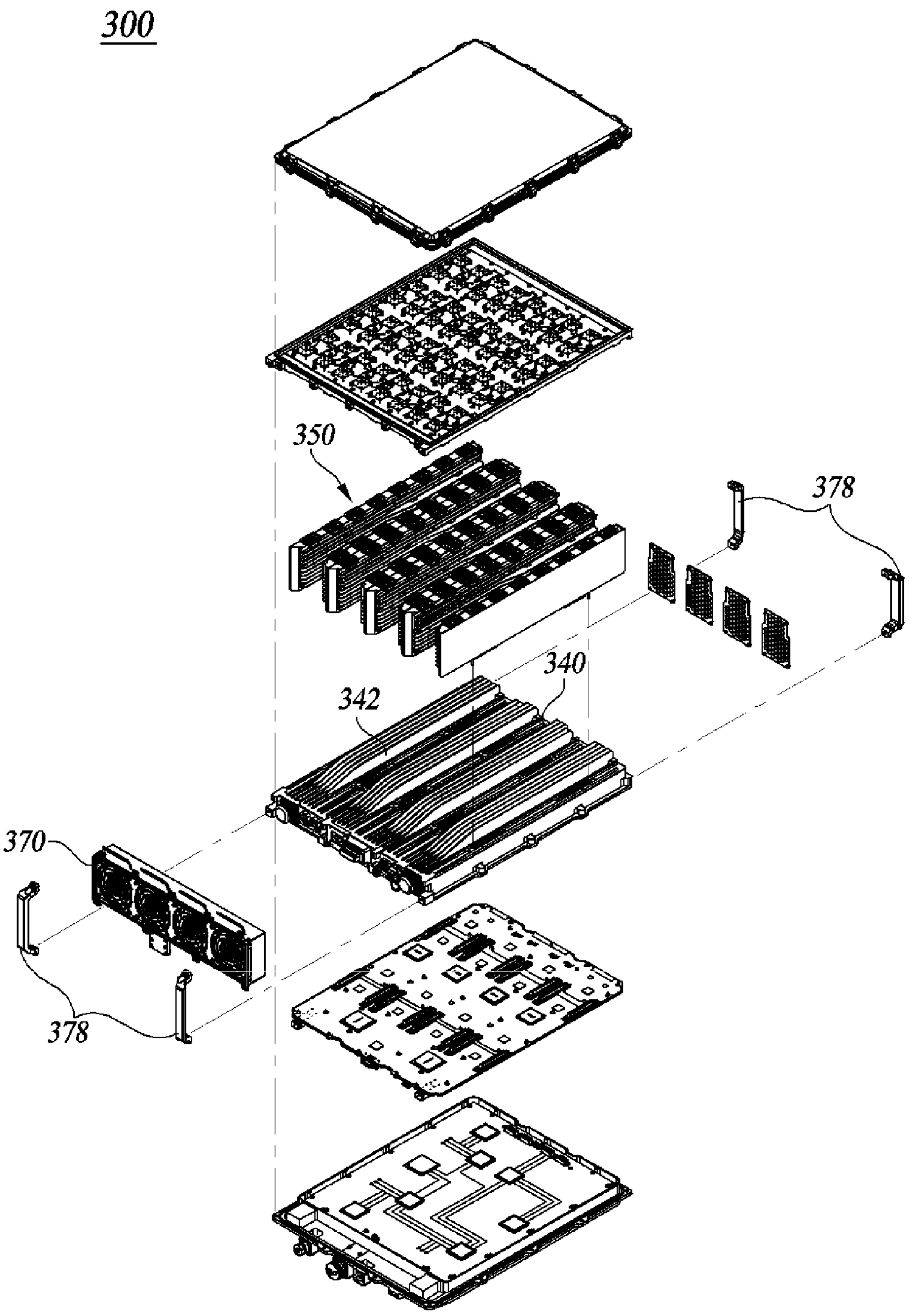
FIG. 14 is an exploded perspective view of the antenna apparatus according to yet another embodiment of the present disclosure.

FIG. 13 is a front perspective view of an antenna apparatus according to yet another embodiment of the present disclosure. FIG. 14 is an exploded perspective view of the antenna apparatus according to yet another embodiment.

As shown in FIGS. 13 and 14, yet another antenna apparatus 300 according to yet another embodiment of the present disclosure further includes grip members 378.

The grip members 378 are each configured to protrude from at least a portion of a blower fan module 370 externally of the antenna apparatus 300, and they may be configured in a substantially handle shape. The grip members 378 protrude more than ports disposed on one surface of the antenna apparatus 300 on which the blower fan module 370 is disposed. The grip members can protect the ports from external impact.

The grip members 378 are preferably formed so that the user can easily hold them by hand. Accordingly, when moving the antenna apparatus 300, the user can hold the same by the grip members 378 conveniently.

Figure 15:
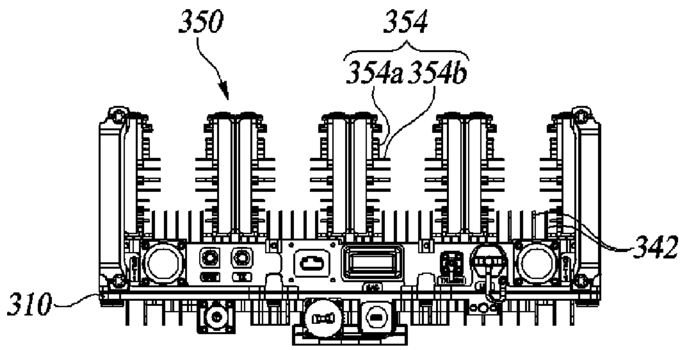
FIG. 15 is a front view showing heat dissipation supports coupled to a middle housing according to yet another embodiment.
Figure 16:
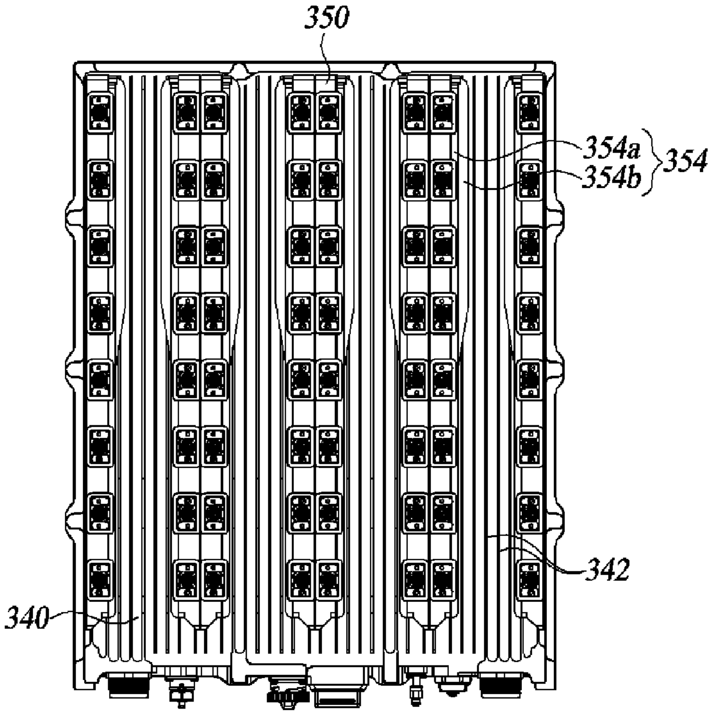
FIG. 16 is a plan view showing the heat dissipation supports coupled to the middle housing in the antenna apparatus according to yet another embodiment.

FIG. 15 is a front view showing heat dissipation supports coupled to a middle housing according to yet another embodiment. FIG. 16 is a plan view showing the heat dissipation supports coupled to the middle housing in the antenna apparatus according to yet another embodiment.

As shown in FIGS. 15 and 16, an antenna apparatus 300 according to yet another embodiment has first heat dissipation fins 342 that have an equal height. This may be designed differently depending on the amount of heat transferred from a middle housing 340 and the arrangement of electrical components disposed in a first accommodation space (not shown).

In yet another embodiment of the present disclosure, a plurality of second heat dissipation fins 354 includes two or more heat dissipation fins 354*a* having a first width. Additionally, the second heat dissipation fins 354 may include two or more heat dissipation fins 354*b* having a second width greater than the first width between the two or more heat dissipation fins 354*a*. Further, the second heat dissipation fins 354 may include one or more heat dissipation fins (not shown) having a third width greater than the second width between the two or more heat dissipation fins 354*b*. In this case, the first to third widths refer to the widths of the heat dissipation fins 354 at their points farthest from one surface of each heat dissipation support 350.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the embodiments of the present disclosure is not limited by the illustrations. Accordingly, one of ordinary skill would understand the scope of the claimed invention is not to be limited by the above explicitly described embodiments but by the claims and equivalents thereof.

The invention claimed is:

1. An antenna apparatus, comprising:
- a lower housing;
- a middle housing disposed on the lower housing and having one surface formed with one or more first heat dissipation fins;
- a first accommodation space formed by the lower housing and the middle housing;
- at least one first heat-generating element disposed in the first accommodation space;
- one or more heat dissipation supports each disposed on the middle housing and having at least one surface formed with one or more second heat dissipation fins; and
- an antenna module supported on the one or more heat dissipation supports,
- wherein the heat dissipation supports protrude in a first direction and comprise:
- two or more heat dissipation supports spaced apart along a second direction different from the first direction, and
- wherein the first heat dissipation fins are disposed to be spaced apart from each other in the second direction between adjacent ones of the heat dissipation supports and protrude in an upright direction of the heat dissipation supports.

2. The antenna apparatus of claim 1, wherein the first heat dissipation fins comprise:
- two or more heat dissipation fins having a first height; and
- at least one heat dissipation fin disposed between the two or more heat dissipation fins and having a second height greater than the first height.

3. The antenna apparatus of claim 1, wherein the first heat dissipation fins are formed to have an equal height.

4. The antenna apparatus of claim 1, wherein the heat dissipation supports extend in a third direction different from the first direction and the second direction and further comprise:
- at least one mesh member disposed adjacent to an opposite end to one end of the heat dissipation support in a direction in which the heat dissipation support extends.

5. The antenna apparatus of claim 1, wherein the first accommodation space is configured to accommodate a power supply unit (PSU).

6. The antenna apparatus of claim 1, wherein the heat dissipation supports are each configured to electrically connect the antenna module with elements disposed in the first accommodation space.

7. The antenna apparatus of claim 6, wherein the heat dissipation support comprises:
- a second accommodation space formed internally of the heat dissipation support;
- a substrate disposed in the second accommodation space; and
- one or more FPGA elements mounted on the substrate.

8. The antenna apparatus of claim 1, wherein the antenna module comprises:
- a printed circuit board (PCB) and antenna elements mounted on the PCB.

9. The antenna apparatus of claim 1, further comprising:
- a digital board disposed in the first accommodation space and having a digital processing circuit.

10. The antenna apparatus of claim 1, wherein the lower housing comprises:
- a heat dissipation bottom protruding downward from at least one surface of the lower housing.

11. The antenna apparatus of claim 1, further comprising:
- a radome disposed on the antenna module.

12. An antenna apparatus, comprising:

a lower housing;

a middle housing disposed on the lower housing and having one surface formed with one or more first heat dissipation fins;

a first accommodation space formed by the lower housing and the middle housing;

at least one first heat-generating element disposed in the first accommodation space;

one or more heat dissipation supports each disposed on the middle housing and having at least one surface formed with one or more second heat dissipation fins; and an antenna module supported on the one or more heat dissipation supports, wherein the heat dissipation supports protrude in a first direction and comprise:

two or more heat dissipation supports spaced apart along a second direction different from the first direction, and wherein the heat dissipation supports extend in a third direction different from the first direction and the second direction and further comprise:

one or more second heat dissipation fins protruding in the second direction from the at least one side of the heat dissipation supports and extending along the third direction.

13. The antenna apparatus of claim 12, wherein the second heat dissipation fins are disposed to be spaced apart from each other along an upright direction of the heat dissipation supports.

14. The antenna apparatus of claim 13, wherein the second heat dissipation fins comprise:

two or more heat dissipation fins having a first width; and at least one heat dissipation fin disposed between the two or more heat dissipation fins and having a second width greater than the first width.

15. The antenna apparatus of claim 12, wherein the heat dissipation support and the second heat dissipation fins are integrally manufactured through extrusion molding.

16. An antenna apparatus, comprising:

a lower housing;

a middle housing disposed on the lower housing and having one surface formed with one or more first heat dissipation fins;

a first accommodation space formed by the lower housing and the middle housing;

at least one first heat-generating element disposed in the first accommodation space;

one or more heat dissipation supports each disposed on the middle housing and having at least one surface formed with one or more second heat dissipation fins; and an antenna module supported on the one or more heat dissipation supports, wherein the heat dissipation supports protrude in a first direction and comprise:

two or more heat dissipation supports spaced apart along a second direction different from the first direction, and wherein the heat dissipation supports extend in a third direction different from the first direction and the second direction and further comprise:

at least one blower fan module disposed adjacent to one end of the heat dissipation support in a direction in which the heat dissipation support extends, and configured to cool the heat dissipation support.

17. The antenna apparatus of claim 16, wherein the blower fan module has at least one surface formed with protective protrusions protruding outward.

18. The antenna apparatus of claim 16, wherein the blower fan module has at least one surface formed with one or more grip parts protruding outward.

* * * * *